CLARENCE S. HUNTER
INVENTOR.

ATTORNEY & AGENT

United States Patent Office 3,488,195
Patented Jan. 6, 1970

3,488,195
LIGHT-SENSITIVE PHOTOGRAPHIC ELEMENT
Clarence S. Hunter, Rochester, N.Y., assignor to Eastman Kodak Company, Rochester, N.Y., a corporation of New Jersey
Continuation-in-part of application Ser. No. 561,432, June 29, 1966. This application Feb. 5, 1969, Ser. No. 796,725
Int. Cl. G03c 1/84, 1/80
U.S. Cl. 96—84                                    4 Claims

ABSTRACT OF THE DISCLOSURE

Linear polyester film supports for photographic emulsion layers, especially X-ray emulsion layers, are colored with certain anthraquinone dyes stable to decomposition and sublimation at extrusion temperatures of about 400 to 600° F.

---

Figure 1:
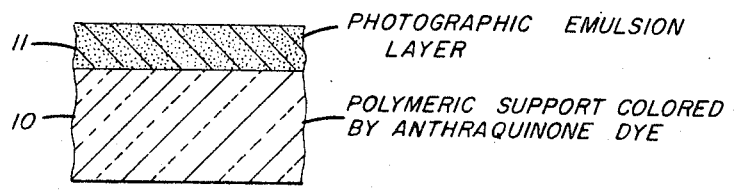

This application is a continuation-in-part of U.S. Ser. No. 561,432, filed June 29, 1966, now abandoned.

This invention relates to photography and more particularly to photographic films including a light-sensitive photographic emulsion layer adhered to a linear polyester film support colored with certain anthraquinone compounds.

Light-sensitive photographic elements including a colored film support are known in the art. Photographic film particularly adapted to use in taking X-ray pictures has a film support usually tinted with a blue dye to aid in the examination of the X-ray patterns obtained thereon for obtaining accurate diagnosis of complex radiographs of, for example, sinus or lung areas. The dye used for coloring the support should be stable, particularly under adverse conditions of temperature and humidity as may be encountered during the storage of the film. In addition, the dye should have no adverse effect upon the photographic emulsion and have the desired hue. However, dyes vary widely in their stability to heat and photographic activity and it has been difficult to find a blue dye generally suitable for this purpose. More particularly, since the polyester film support is prepared by extrusion of a hot composition at temperatures of the order of 400 to 600° F., the stability of the dye to decomposition and sublimation by heat is even more important. Very few dyes, especially blue dyes, have the required stability at the polyester extrusion temperatures of about 400 to 600° F. A very wide range of dyes can be used in other polymeric extrusions when they can be carried out below about 400° F., e.g. cellulose ester extrusions. However, as mentioned, very few blue dyes have the desired color and stability at the high temperatures used for extrusion of polyester film bases.

We have discovered that certain anthraquinone dyes have the required stability and impart the requisite color to photographic film supports and particularly to film supports adapted to use for X-ray films. These dyes are: 1,4-dimesidino anthraquinone; 1,5-bis(para toluidine)-4,8-dihydroxy anthraquinone; 4-anilino-1,8-dihydroxy-5-nitro-anthraquinone; 5 - anilino - 4 - amino - 1,8 - dihydroxy anthraquinone; 1,4-bis(2,6-diethylanilino)-anthraquinone; 4-(4-β-hydroxyethylanilino)-1,8-dihydroxy-5-nitro anthraquinone; 4-(4-β-hydroxyethylanilion)-1,8-dihydroxy-5-amino anthraquinone; 1,5-di[p-(β-hydroxyethoxyethoxy)phenyl] - amino - 4,8 - dihydroxy anthraquinone.

The above dyes are stable under a wide range of conditions of temperature and humidity such as encountered in the extrusion of colored films from a hot polymeric melt. These anthraquinone dyes can be expected to exhibit substantially better heat stability than similar anthraquinone dyes, particularly when used in the preparation of polyester film supports by processes involving extrusion and orientation steps in the presence of heat. The color of the dye remains substantially unchanged in the presence of heat, and photographic processing solutions have substantially no effect upon the color of the film support containing the dye.

Representative linear polyester films and film supports in which the above anthraquinone dyes are useful comprise polyesters having a melting point above about 200° C., for example, polyalkylene dicarboxylates such as polyethylene terephthalate and poly(1,4 - cyclohexanedimethylene terephthalate). Representative linear polyesters are prepared in a well-known manner from glycols and dibasic acids such as terephthalic acid, trans-hexahydroterephthalic acid, p,p'-sulfonyldibenzoic acid, 4,4'-diphenic acid, 4,4'-benzophenonedicarboxylic acid, 1,2-di(p - carboxyphenyl)ethane, 1,2 - di(p - carboxyphenoxy)ethane, 4,4'-dicarboxydiphenyl ether, etc. Fused rings can also be present such as in 2,7- 1,4- or 1,5-naphthalenedicarboxylic acid. Suitable glycols include ethylene glycol, 1,3-propanediol, 1,4-butanediol, 2,2-dimethyl-1,3-propanediol, 1,4-cyclohexanedimethanol and the like.

The anthraquinone dyes are incorporated into the polyester films by blending one or more of the above dyes with powdered polyester followed by extruding a colored molten film onto a casting wheel to form a substantially amorphous unoriented film, then biaxially orienting the film and heat treating to enhance dimensional stability. The biaxial orientation can be performed by drafting the amorphous film lengthwise to about 2.5 to 4.5 times its original length, followed by tentering the drafted film widthwise to about 2.5 to 4.5 times its drafted width, and then heat-setting and also, if desired, heat relaxing the biaxially oriented film. Such processes are described in Scarlett U.S. Patent No. 2,823,421 and Alles U.S. Patent No. 2,779,684 and many other similar disclosures and need no further description herein. A subbing layer such as described below can be applied to one or both surfaces of the film at one or more placed before or during the orientation process. Similarly, the melted or dissolved dye may be added to the polyester during its manufacture.

The anthraquinone dye imparts useful color to the polyester film supports when used in amounts of the order of 50 to 500 parts p.p.m. of the polymer. More or less than this amount can be used as desired.

Light-sensitive emulsions known in the art, particularly gelatin-silver halide emulsions, are coated upon the polyester supports containing the anthraquinone dye. These emulsions include, for example, silver bromide, silver chloride, and silver bromoiodide emulsions. The emulsion can be coated on one or both sides of the colored film support and when the film is to be used for X-ray purposes, it is desirable to apply the emulsion to both sides of the support. The hydrophilic organic colloid vehicle of the emulsion may be varied, but is preferably gelatin. Other useful hydrophilic organic colloid vehicles which can be used alone or in conjunction with gelatin include partially hydrolyzed cellulose esters, polyvinyl alcohol and partially hydrolyzed polyvinyl esters. Subbing methods known in the art can be used for adhering the emulsion to the colored film support as illustrated in the examples below. The polyester supports can be electron bombarded to effect adhesion of the emulsions, and, as metioned, the polyester supports can be subbed prior to or during the orientation steps using polymeric subbing compositions such as disclosed in the Nadeau et al., U.S. Patent No. 3,143,421 comprising a dihydroxy aromatic compound and a vinylidene chloride copolymer, as illustrated in the example below. A gelatin-containing vinylidene chloride copolymer prepared as described in Ream et al., U.S. Patent 3,403,116 is also useful for subbing the polyester supports, i.e. prepared by polymerization of a mixture of (A) from about 5 to 45 percent by weight of a monomer selected from the group consisting of acrylonitrile, methacrylonitrile and alkyl acrylates wherein the alkyl group contains 1 to 6 carbon atoms, (B) from about 50 to 90 percent by weight of vinylidene chloride monomer, (C) from about 2 to 12 percent by weight of a monomer selected from the group consisting of acrylic acid, itaconic acid and monomethyl itaconate, the total of (A), (B) and (C) being 100 percent, and (D) from about 15 to 60 percent by weight of gelatin based upon the total weight of (A), (B) and (C). These gelatin-containing copolymers can be applied to the polyester supports as described by Nadeau et al., U.S. Patent application Ser. No. 597,669, filed Nov. 29, 1966.

Figure 2:
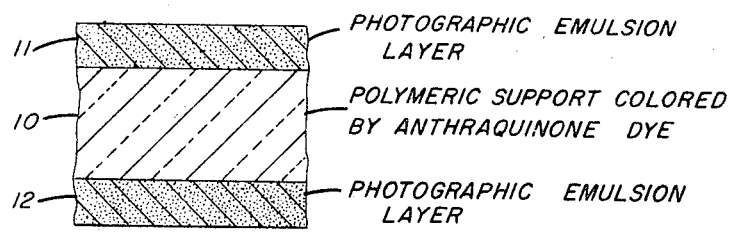

The accompanying drawings show in greatly enlarged cross-sectional view representative photographic elements of our invention. In FIG. 1 the polyester film support 10, such as polyethylene terephthalate film support, contains one of the mentioned anthraquinone dyes and is provided with the light-sensitive photographic emulsion layer 11 such as a gelatin-silver bromoiodide emulsion layer. In FIG. 2 is shown a similar photographic element having the colored polyester film support 10 and provided with emulsion layers 11 and 12 which may be the same or different photographic emulsions such as gelatin-silver bromoiodide emulsions of high silver halide content as desired.

The following examples will serve to illustrate our invention.

Example 1

To powdered polyethylene terephthalate is added 190 p.p.m. of one of the above anthraquinone dyes, especially 1,4-bis(2,6-diethylanilino)anthraquinone, after which the powder is extruded onto a casting wheel. A thin layer of the following subbing composition is then coated on the polyester film, the proportions being given in terms of weight percent.

| 7% terpolymer comprising: | Percent |
|---|---|
| Methyl acrylate | 15 |
| Itaconic acid | 2 |
| Vinylidene chloride | 83 |
| Dispersing agent, sodium salt of alkyl and aryl polyether sulfate (Triton 770) | 0.1 |
| Spreading agent, saponin | 0.5 |
| Distilled water | 91.9 |
| Resorcinol | 0.5 |

The subbing composition was applied at a coverage of approximately 10 to 50 grams per 1,000 square feet of polyester surface to yield a subbing layer about 0.5 to 2 microns thick. The resulting subbed film is then biaxially oriented as described above, followed by application of a thin gelatin subbing layer coated from an aqueous solution of gelatin and chrome alum. Thereafter, a gelatin-silver bromoiodide emulsion layer is coated on the subbed film support in the well-known manner. Examination of the film before and after processing in photographic processing solutions showed that the color of the film support remains substantially unchanged. The color was also stable upon storage of the film before and after processing under adverse conditions of temperature and humidity. In addition, the orientation steps employed in preparation of the film support did not alter the color of the support. The film before processing appears in cross-section substantially as shown in FIG. 1 of the drawings.

Example 2

A film particularly suitable for X-ray use of prepared in the same manner as described in Example 1, except that a gelatin-silver bromoiodide emulsion suitable for X-ray purposes is coated on both sides of the polyester support which had previously been subbed with the terpolymer composition followed by the gelatin subbing composition. This film is particularly useful for X-ray purposes since the anthraquinone dye or dyes present in the support facilitates accurate visual inspection and diagnosis of the X-ray patterns in the emulsion layers.

In the manner of the above examples, the specified dyes are incorporated into powdered polyesters and extruded in the form of films, fibers and other forms wherein the color of the dye is found to be unchanged by the heat of extrusion. The colored fibers are useful in the textile industry for the production of cloth. The films are especially useful as photographic film supports.

The invention has been described in considerable detail with particular reference to preferred embodiments thereof, but it will be understood that variations and modifications can be effected within the spirit and scope of the invention.

I claim:
1. A light-sensitive photographic element comprising a linear polyester support containing as a coloring material, at least one of the compounds 1,4-dimesidino anthraquinone, 1,5 - bis-(para toluidine) - 4,8 - dihydroxy anthraquinone, 4-anilino-1,8-dihydroxy-5-nitro-anthraquinone, 5 - anilino-4-amino-1,8-dihydroxy anthraquinone, 1,4 - bis (2,6 - diethylanilino)anthraquinone, 4-(4-$\beta$-hydroxyethylanilino)-1,8-dihydroxy-5-nitro anthraquinone, 4-(4-$\beta$-hydroxyethylanilino)-1,8-dihydroxy-5-amino anthraquinone and 1,5-di[p - ($\beta$ - hydroxyethoxyethoxyethoxy)phenyl] amino-4,8-dihydroxy anthraquinone and a photographic emulsion layer adhered to at least one surface of said support.

2. The element of claim 1 wherein the support containing the designated coloring material is polyethylene terephthalate.

3. The element of claim 1 wherein the polyester support is biaxially oriented.

4. The element of claim 1 wherein the emulsion layer is a gelatin-silver halide emulsion layer adhered to the polyester support by means of a vinylidene chloride copolymer subbing layer.

References Cited

UNITED STATES PATENTS

| 2,384,001 | 9/1945 | Wesson | 8—40 |
| 2,508,295 | 5/1950 | Reckmeyer | 96—84 |
| 2,571,319 | 10/1951 | Waters et al. | 18—54 |
| 2,622,026 | 12/1952 | Hunter et al. | 96—84 |
| 2,627,088 | 2/1953 | Alles et al. | 96—84 |
| 2,641,602 | 6/1953 | Straley et al. | 260—575 XR |
| 2,830,062 | 4/1958 | Lodge | 8—39 |
| 2,837,437 | 6/1958 | Finlayson | 8—4 |
| 3,082,218 | 3/1963 | Buxbaum et al. | 8—39 |

FOREIGN PATENTS

| 515,404 | 8/1955 | Canada. |
| 968,244 | 9/1964 | Great Britain. |

NORMAN G. TORCHIN, Primary Examiner

RONALD H. SMITH, Assistant Examiner

U.S. Cl. X.R.

8—4, 39; 96—87